(12) United States Patent
Yoshida et al.

(10) Patent No.: US 9,638,990 B2
(45) Date of Patent: May 2, 2017

(54) PROJECTOR DEVICE WITH LUMINOUS TUBE HAVING A PAIR OF ELECTRODES IN A VERTICAL DIRECTION

(71) Applicant: PANASONIC INTELLECTUAL PROPERTY MANAGEMENT CO., LTD., Osaka (JP)

(72) Inventors: Masayoshi Yoshida, Osaka (JP); Shunsuke Ono, Osaka (JP); Naoki Uekura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/840,599

(22) Filed: Aug. 31, 2015

(65) Prior Publication Data

US 2016/0070159 A1 Mar. 10, 2016

(30) Foreign Application Priority Data

Sep. 4, 2014 (JP) .................................. 2014-180299
Apr. 22, 2015 (JP) .................................. 2015-087495

(51) Int. Cl.
G03B 21/20 (2006.01)
G03B 21/00 (2006.01)

(52) U.S. Cl.
CPC ..... *G03B 21/2026* (2013.01); *G03B 21/2066* (2013.01); *G03B 21/005* (2013.01); *G03B 21/2053* (2013.01)

(58) Field of Classification Search
CPC .............. G03B 21/208; G03B 21/2026; G03B 21/2066; H01J 61/82; H01J 61/84; H01J 61/86; H01J 61/98; H01J 61/125; H01J 61/363; H01J 61/827; H01J 61/365; H01J 61/366
See application file for complete search history.

(56) References Cited

U.S. PATENT DOCUMENTS

| | | | |
|---|---|---|---|
| 9,041,287 B2 | 5/2015 | Sakaguchi et al. | |
| 2006/0279711 A1* | 12/2006 | Yoshii | F21V 29/02 353/97 |
| 2009/0153806 A1* | 6/2009 | Yamauchi | G03B 21/00 353/85 |

(Continued)

FOREIGN PATENT DOCUMENTS

| | | |
|---|---|---|
| JP | 6-235975 | 8/1994 |
| JP | 2005-062590 | 3/2005 |

*Primary Examiner* — Sultan Chowdhury
(74) *Attorney, Agent, or Firm* — Greenblum & Bernstein, P.L.C.

(57) ABSTRACT

A projector device of the present disclosure includes a luminous tube made of quartz glass, a concave reflecting mirror in which the luminous tube is disposed, and an optical unit for projecting an image by utilizing light emitted from the concave reflecting mirror. The luminous tube has a luminous part, in which at least mercury is enclosed inside and a pair of electrodes is disposed so as to face each other, and a pair of sealing parts extending from the luminous part in opposite directions to each other. The luminous tube is disposed so as to direct the pair of electrodes in a vertical direction. A region of the image projected from the optical unit is a horizontally long rectangle.

10 Claims, 14 Drawing Sheets

(56) References Cited

U.S. PATENT DOCUMENTS

| | | | |
|---|---|---|---|
| 2009/0231555 A1* | 9/2009 | Nagarekawa | G03B 21/28 353/99 |
| 2010/0066985 A1* | 3/2010 | Uekura | G03B 21/14 353/99 |
| 2011/0063584 A1* | 3/2011 | Hirao | H05B 41/2883 353/85 |
| 2014/0375965 A1* | 12/2014 | Suzuki | G03B 21/16 353/57 |

* cited by examiner

PROJECTOR DEVICE WITH LUMINOUS TUBE HAVING A PAIR OF ELECTRODES IN A VERTICAL DIRECTION

BACKGROUND OF THE INVENTION

1. Field of the Invention

The present application relates to a projector device.

2. Description of the Related Art

Conventionally, a high pressure discharge lamp, particularly a high pressure mercury lamp, has been used for a light source of a projector device. The high pressure mercury lamp includes a luminous tube made of quartz glass. The luminous tube has a luminous part, in which a discharge space is formed inside, and a pair of sealing parts extending from this luminous part in opposite directions to each other. In the luminous part, a pair of electrodes is located on a center axis in a longitudinal direction of the luminous tube and is disposed so as to face each other. Therefore, a center axis in a longitudinal direction of the pair of electrodes and the center axis in the longitudinal direction of the luminous tube substantially coincide with each other. Such a luminous tube is disposed inside a light source unit so that an optical axis inside a reflecting mirror and the center axis in the longitudinal direction of the electrodes substantially coincide with each other. Further, the light source unit is incorporated into the projector device in a state in which the center axis in the longitudinal direction of the electrodes in the luminous part is substantially horizontal.

For example, as disclosed in Unexamined Japanese Patent Publication No. H06-235975, when an axis of light (an optical axis) emitted from a projector device is substantially horizontal, the light emitted from the projector device is projected so as to form a horizontally long rectangular image onto a vertically erected screen. A reason for projecting the horizontally long rectangular image is to be compatible with a standard. As for installation of the projector device, for example, Unexamined Japanese Patent Publication No. 2005-62590 discloses an example in which a projector device is used in vertical placement. By vertically placing the projector device, a vertically long rectangular image can be utilized. By disposing a plurality of vertically placed projector devices side by side, the respective vertically long rectangular images are connected and a large screen can be realized.

SUMMARY OF THE INVENTION

A projector device of the present disclosure includes a luminous tube made of quartz glass, a concave reflecting mirror in which the luminous tube is disposed inside, and an optical unit for projecting an image by utilizing light emitted from the concave reflecting mirror. The luminous tube has a luminous part and a pair of sealing parts, the luminous part having at least enclosed mercury and a pair of electrodes disposed so as to face each other, the pair of sealing parts extending from the luminous part in opposite directions to each other. The luminous tube is disposed so as to direct the pair of electrodes in a vertical direction. A region of the image projected from the optical unit is a horizontally long rectangle.

According to the projector device of the present disclosure, a position of devitrification occurred in the luminous tube can be excluded from an effective range from which the light is extracted. Even if the devitrification occurs in vicinities of the sealing parts of the luminous part, such devitrification does not affect the emitted light. According to the present disclosure, reduction in an illuminance maintenance rate can be suppressed.

DETAILED DESCRIPTION OF THE PREFERRED EMBODIMENT

A related technique will be described before a concrete exemplary embodiment of the present disclosure is described.

In a known projector device, a high pressure discharge lamp is lit in a state in which a center axis in a longitudinal direction of electrodes is substantially horizontal. During the lighting, a surface temperature of a luminous tube reaches near 1000° C. As a result, an upward center of a luminous part, particularly located upward in a vertical direction, becomes cloudy in the luminous tube made of quartz glass. When the luminous tube becomes cloudy, a light transmittance at that region is considerably reduced. Such cloudiness of quartz glass is a phenomenon called devitrification and is generated by crystallizing an amorphous material. The devitrification blocks emitted light from a discharge space. Accordingly, light flux is deteriorated. In other words, an illuminance maintenance rate of the high pressure discharge lamp is reduced by the devitrification. In order to prolong a life of the lamp, it is required to suppress occurrence of the devitrification.

Figure 1:
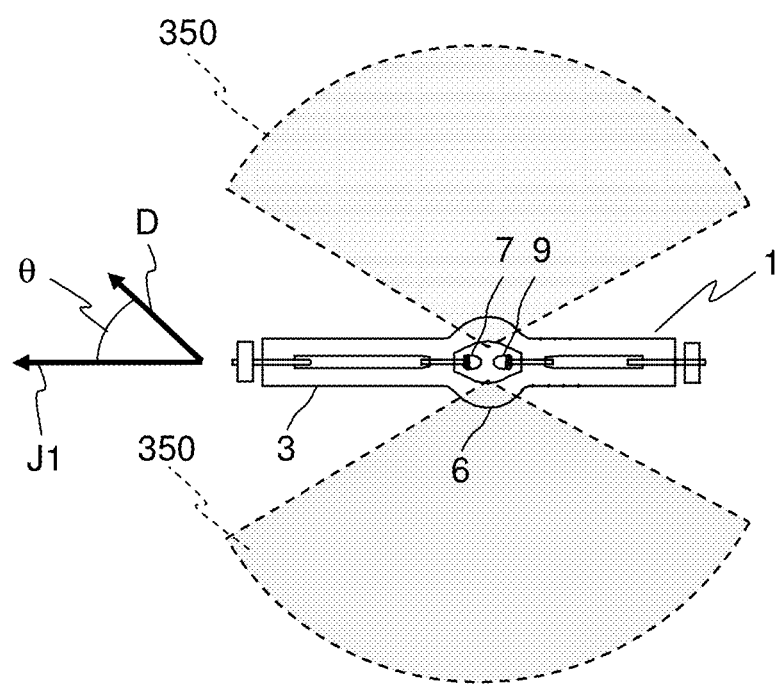
FIG. 1 is a sectional view schematically illustrating a disposition of a high pressure discharge lamp inside a known projector device and an angular range of light emitted from the high pressure discharge lamp.
Figure 1:
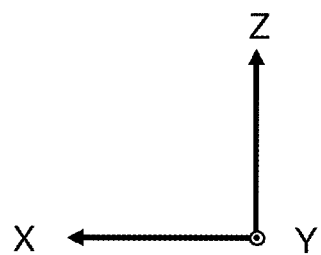

FIG. 1 schematically illustrates a disposition example of high pressure discharge lamp 1 inside a known projector device and an angular range of light emitted from high pressure discharge lamp 1. In FIG. 1, coordinate axes formed of an X-axis, a Y-axis, and a Z-axis which are orthogonal to each other are illustrated to simplify description. An X-Y surface is parallel to a horizontal surface, and the Z-axis is parallel to a vertical direction. In the present specification, a center axis in a longitudinal direction of electrodes 7, 9 included in high pressure discharge lamp 1 may be referred to as an axis J1. An arrow D in FIG. 1 indicates a direction inclined at θ relative to this axis J1.

High pressure discharge lamp 1 illustrated in FIG. 1 is disposed so that center axis J1 in the longitudinal direction of electrodes 7, 9 is parallel to the horizontal surface (the X-Y surface) and is orthogonal to the vertical direction (the Z-axis). Such a disposition is referred to as a horizontal lighting disposition in the present specification. A disposition of high pressure discharge lamp 1 in the conventional projector device is the horizontal lighting disposition.

Intensity of light emitted from high pressure discharge lamp 1 changes depending on the angle θ relative to the center axis (axis J1) in the longitudinal direction of the electrodes. Generally, the light of high pressure discharge lamp 1 indicates the highest intensity in a direction orthogonal to axis J1, i.e., in a direction at the angle θ of approximately 90°. Further, the light of high pressure discharge lamp 1 indicates the lowest intensity in a direction at the angle θ of nearly 0° and 180°. When high pressure discharge lamp 1 is used in combination with a reflecting mirror having a parabolic reflection surface, light reflected by a concave reflection surface among pieces of light emitted from high pressure discharge lamp 1 advances parallel to axis J1. This light is utilized for image projection. FIG. 1 schematically illustrates an effective range 350 indicating an angle which can be utilized for the image projection by extracting light emitted from luminous part 6. This effective range 350 extends symmetrically around axis J1. The angle θ of effective range 350 schematically illustrated in FIG. 1 ranges, for example, from 25° to 155° inclusive. Light distribution characteristics of high pressure discharge lamp 1 depends on a structure and a shape of luminous tube 3, a shape and a size of each of electrodes 7, 9, a distance between the electrodes, and the like. Accordingly, a lower limit and an upper limit of the angle that define effective range 350 can vary. The same applies to a case where the reflection surface is one of various reflection surfaces including an oval reflection surface or the like.

In the luminous tube made of quartz glass of high pressure discharge lamp 1, when the aforementioned devitrification occurs at an end of a lamp life, an upward center of the luminous part becomes cloudy. Hereinafter, a configuration of suppressing deterioration of light flux caused by devitrification according to the exemplary embodiment of the present disclosure will be described with reference to FIGS. 2A and 2B.

Figure 2A:
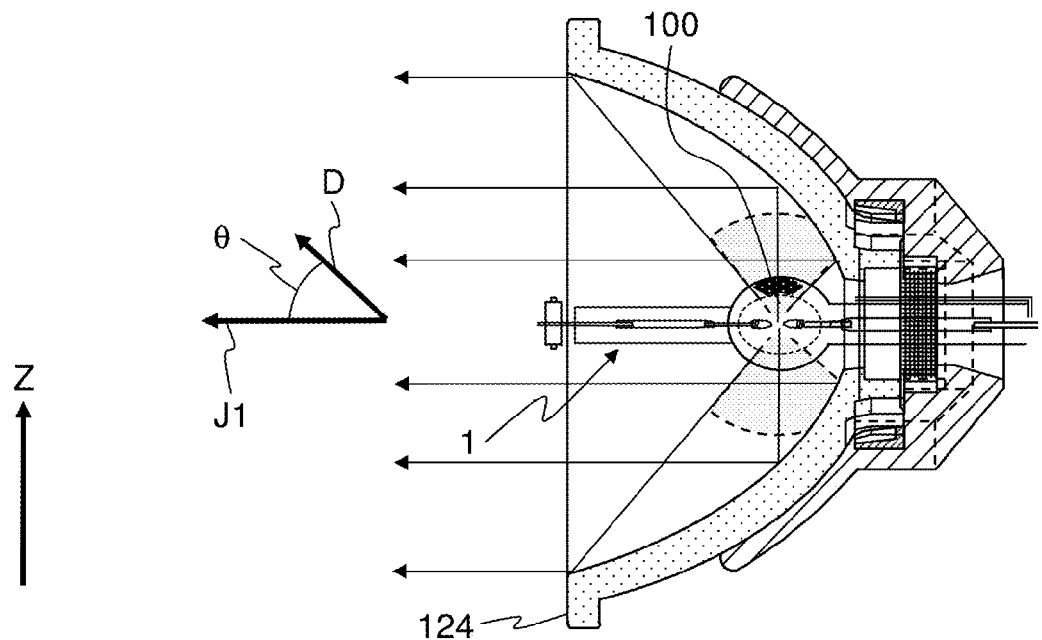
FIG. 2A is a sectional view illustrating a state in which light emitted from the high pressure discharge lamp in a horizontal lighting disposition is reflected by a concave reflecting mirror.

FIG. 2A illustrates a state in which light emitted from high pressure discharge lamp 1 in the conventional horizontal lighting disposition is reflected by concave reflecting mirror 124. When a temperature of high pressure discharge lamp 1 in the horizontal lighting disposition is high, devitrification part 100 occurs at an upward center of luminous part 6 and the upward center of luminous part 6 becomes cloudy. Then, the light emitted in a direction in which the light intensity is highest is affected by devitrification part 100. Such local deterioration of the light intensity caused by devitrification part 100 deteriorates light flux utilized for the image projection.

A typical example of a disposition of high pressure discharge lamp 1 according to the exemplary embodiment of the present disclosure is a disposition in which the center axis (the axis J1) in the longitudinal direction of electrodes 7, 9 is made to coincide with the vertical direction (the Z-axis). In the present specification, such a disposition is referred to as a vertical lighting disposition (FIG. 2B) as opposed to the conventional horizontal lighting disposition (FIG. 2A). From a reason to be described below, it is not necessary that the center axis (axis J1) in the longitudinal direction of the electrodes is completely parallel to the vertical direction (the Z-axis).

Figure 2B:
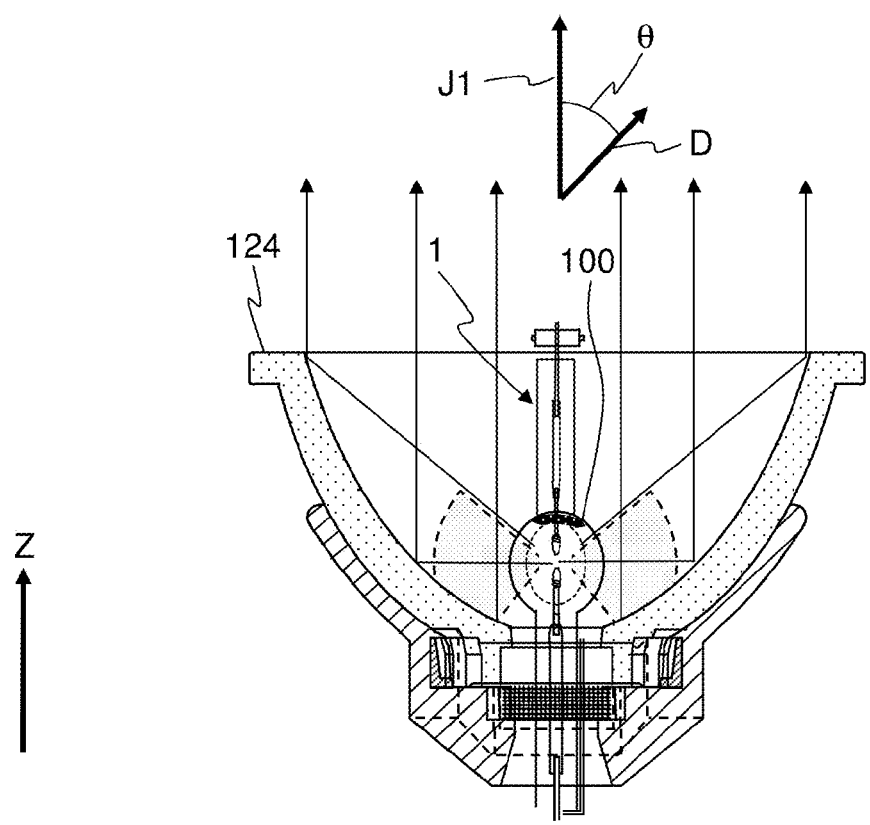
FIG. 2B is a sectional view illustrating a state in which the light emitted from the high pressure discharge lamp in the vertical lighting disposition is reflected by the concave reflecting mirror.

FIG. 2B illustrates a state in which light emitted from high pressure discharge lamp 1 in the vertical lighting disposition is reflected by concave reflecting mirror 124. In this example, the center axis (axis J1) in the longitudinal direction of the electrodes is parallel to the vertical direction (the Z-axis). In a case of the vertical lighting disposition, according to an experiment conducted by the present inventors, as illustrated in FIG. 2B, devitrification part 100 is formed at an upper center of the luminous part in the luminous tube. Even when cloudiness caused by devitrification part 100 occurs at such a position, devitrification part 100 hardly blocks emitted light. As a result, an illuminance maintenance rate of high pressure discharge lamp 1 is hardly reduced. As compared with a case of the horizontal lighting disposition, a life of the lamp can be prolonged approximately from 1.5 to 2 times by the vertical lighting disposition.

Figure 3A:
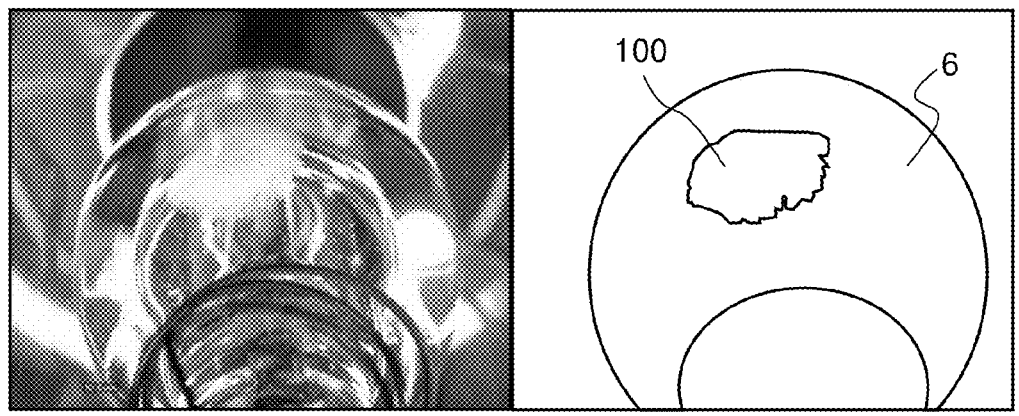
FIG. 3A is a view corresponding to a photograph of a luminous part in the high pressure discharge lamp in the horizontal lighting disposition (left side), and a view illustrating a position of a devitrification part in the luminous part (right side)

FIG. 3A is a view corresponding to a photograph of the luminous part in the high pressure discharge lamp in the horizontal lighting disposition (a left side), and a view illustrating a position of devitrification part 100 in the luminous part (a right side). This drawing illustrates devitrification part 100 when the round luminous part of high pressure discharge lamp 1 is viewed from a direction of the arrow D in FIG. 2A. Devitrification part 100 extends to the center of the luminous part.

Figure 3B:
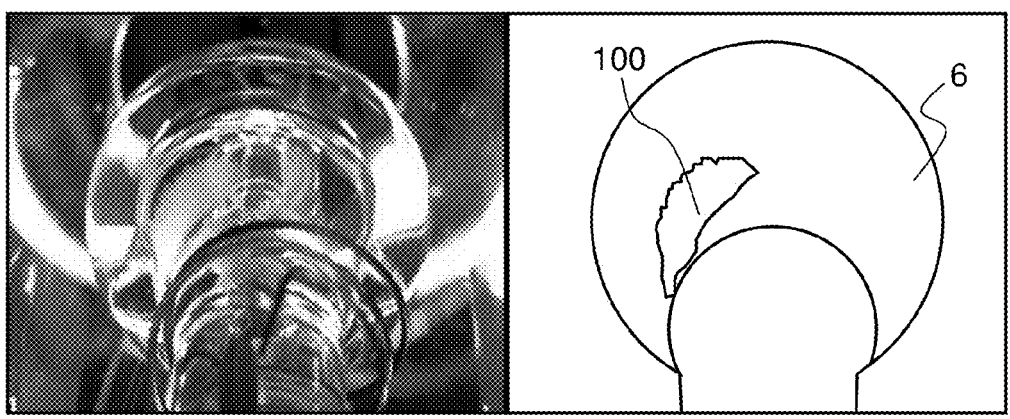
FIG. 3B is a view corresponding to a photograph of the luminous part in the high pressure discharge lamp in the vertical lighting disposition (left side), and a view illustrating a position of the devitrification part in the luminous part (right side)

FIG. 3B is a view corresponding to a photograph of the luminous part in the high pressure discharge lamp in the vertical lighting disposition (a left side), and a view illustrating a position of devitrification part 100 in the luminous part (a right side). This drawing illustrates devitrification part 100 when the round luminous part of high pressure discharge lamp 1 is viewed from the direction of the arrow D in FIG. 2B. Devitrification part 100 occurs at a position closer to an end than the center of the luminous part. When devitrification part 100 is formed at a region illustrated in FIG. 3B, blocking of the light by devitrification part 100 can be sufficiently suppressed.

Figure 4:
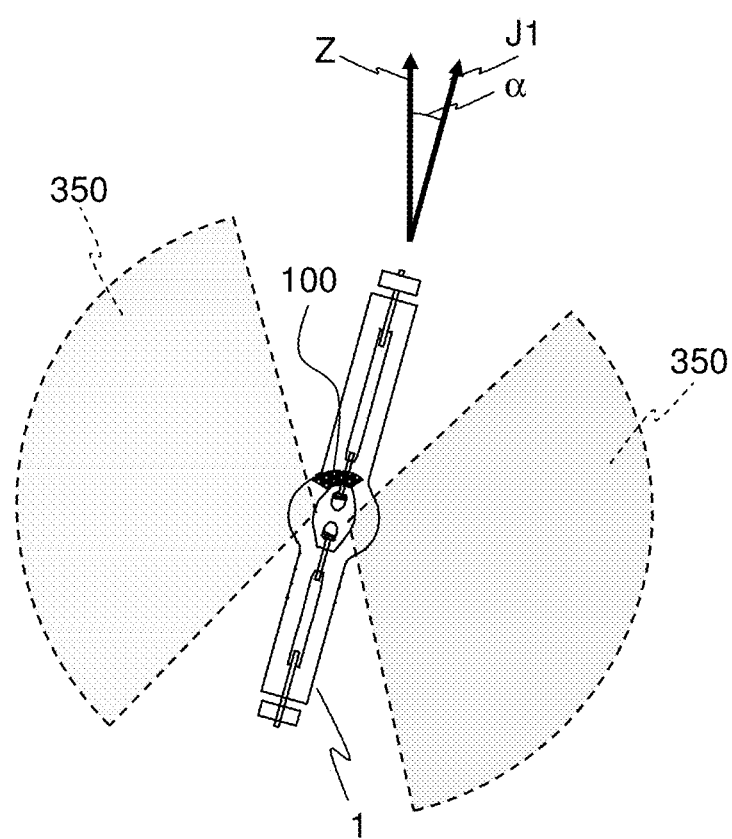
FIG. 4 is a view schematically illustrating a case where an angle α formed by a center axis in a longitudinal direction of electrodes (an axis J1) and a vertical direction (a Z-axis) is not 0°.

FIG. 4 is a view schematically illustrating an example of a case where an angle α formed by the center axis (axis J1) in the longitudinal direction of the electrodes and the vertical direction (the Z-axis) is not 0°. When the angle α becomes large, devitrification part 100 formed at a top of the luminous part may block the light within effective range 350. When the angle α formed by the center axis (axis J1) in the longitudinal direction of the electrodes and the vertical direction (the Z-axis) is 30° or less, blocking of the light within effective range 350 by devitrification part 100 can be sufficiently suppressed. Further, when the angle α is 20° or less, devitrification part 100 hardly blocks the light within effective range 350. Accordingly, in the present specification, the vertical lighting disposition means a disposition in which the angle formed by the center axis (axis J1) in the longitudinal direction of the electrodes and the vertical direction (the Z-axis) is 30° or less. However, even when the angle formed by the center axis (axis J1) in the longitudinal direction of the electrodes and the vertical direction (the Z-axis) exceeds 30°, an influence of devitrification can be sufficiently reduced depending on a structure of the high pressure discharge lamp. When the luminous tube is disposed so that the pair of electrodes is directed closer to the vertical direction than the horizontal direction, the influence of devitrification can be reduced. In the present specification, a case where the pair of electrodes is directed closer to the vertical direction than the horizontal direction is expressed as "the pair of electrodes is directed in the vertical direction". In other words, "the pair of electrodes is directed in the vertical direction" means that the angle formed by the center axis (axis J1) in the longitudinal direction of the electrodes and the vertical direction (the Z-axis) is less than 45°.

By appropriately adjusting the direction (the disposition) of high pressure discharge lamp 1, deterioration of the light intensity and the light flux caused by cloudiness of devitrification part 100 can be prevented. In other words, by directing the center axis (axis J1) in the longitudinal direction of the electrodes in the vertical direction (the Z-axis) in high pressure discharge lamp 1, a forming position of devitrification part 100 can be excluded from the direction in which the light intensity is highest.

Hereinafter, a projector device according to one aspect of the present disclosure will be described with reference to the drawings. Any exemplary embodiment described below gives one preferred concrete example. A numerical value, a shape, a material, a component, a disposition position and a connection form of the component, a process, an order of the process, or the like described in the following exemplary embodiment is one example and is not intended to limit the present disclosure. Further, each of the drawings is a schematic drawing and is not necessarily a strict illustration. In each of the drawings, a substantially identical structure is denoted by an identical sign, and overlapping description of the identical structure is omitted or simplified.

EXEMPLARY EMBODIMENT

Figure 5:
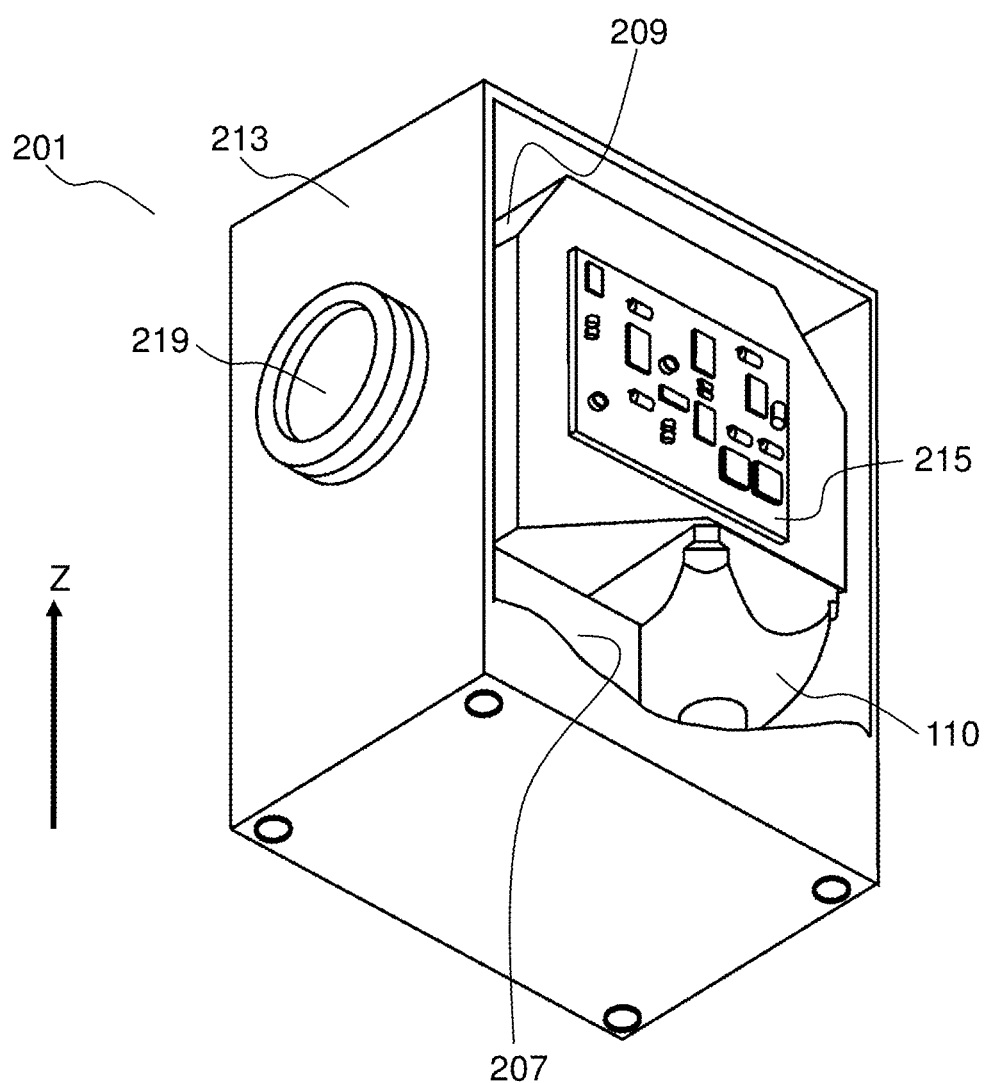
FIG. 5 is a perspective view illustrating a portion of an internal structure of a projector device according to an exemplary embodiment of the present disclosure.
Figure 6:
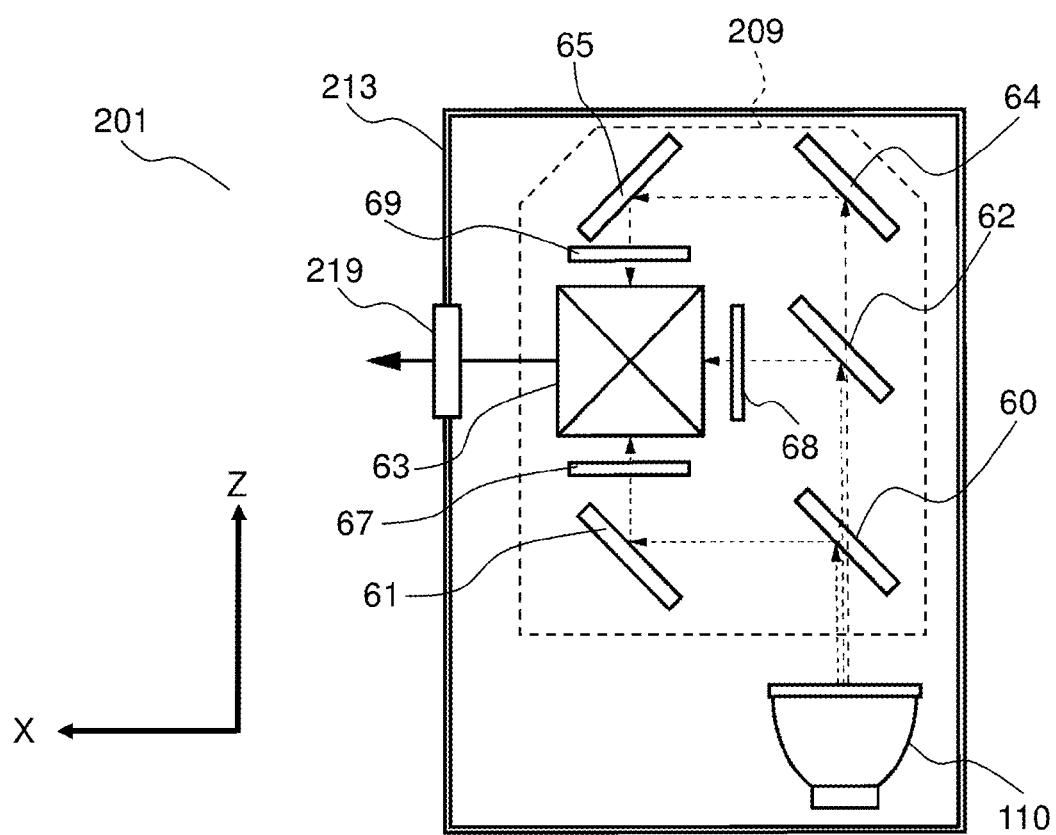
FIG. 6 is a sectional view schematically illustrating an example of an internal structure of an optical unit in the projector device according to the exemplary embodiment of the present disclosure.
Figure 7:
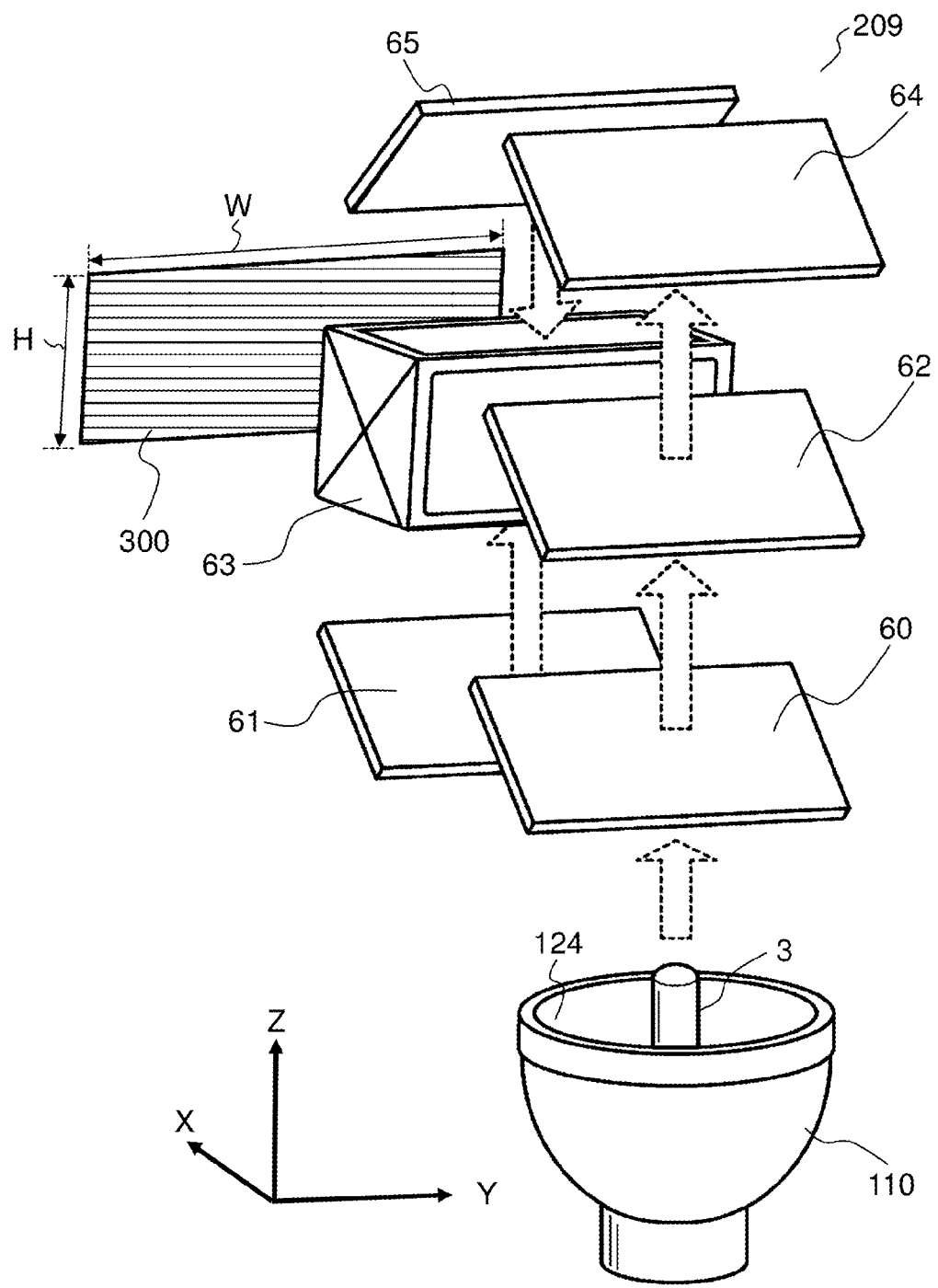
FIG. 7 is a perspective view schematically illustrating the example of the internal structure of the optical unit in the projector device according to the exemplary embodiment of the present disclosure.
Figure 8:
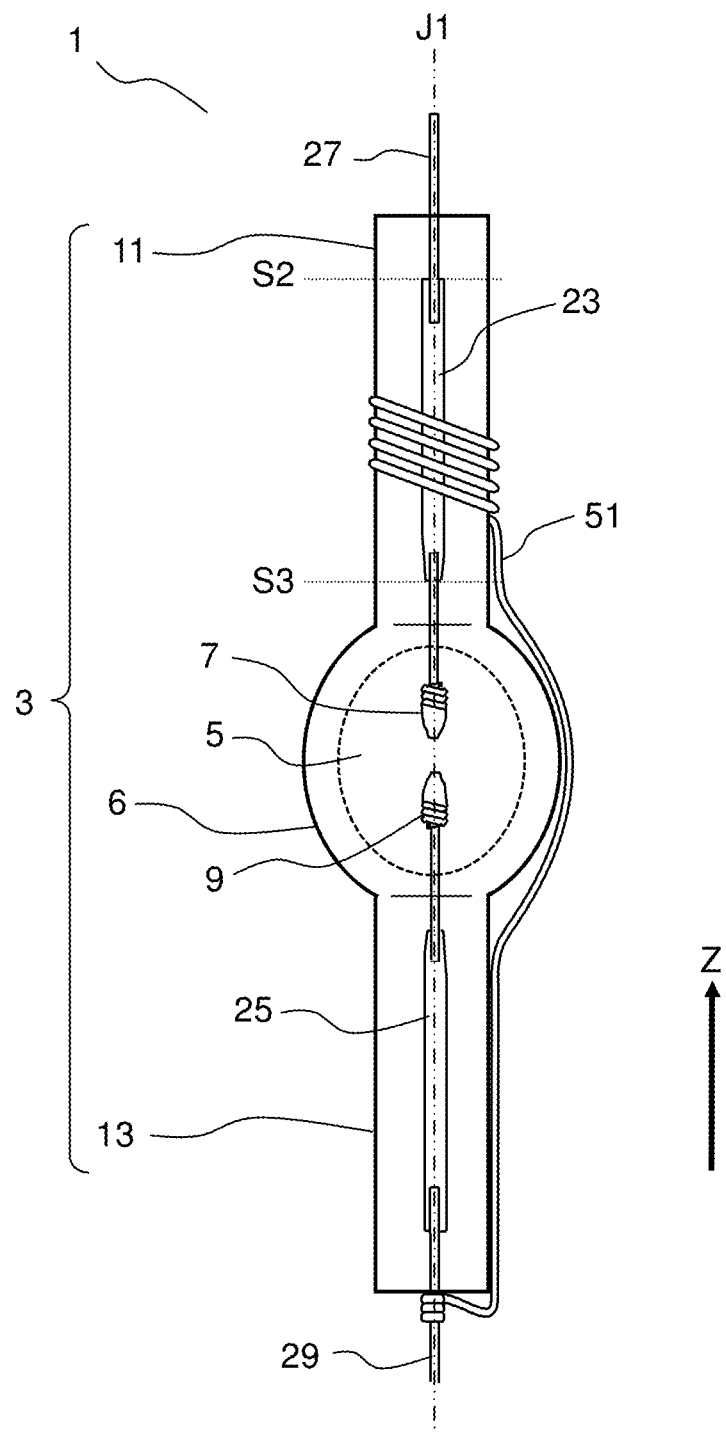
FIG. 8 is a side view illustrating a configuration of the high pressure discharge lamp according to the exemplary embodiment of the present disclosure.
Figure 9:
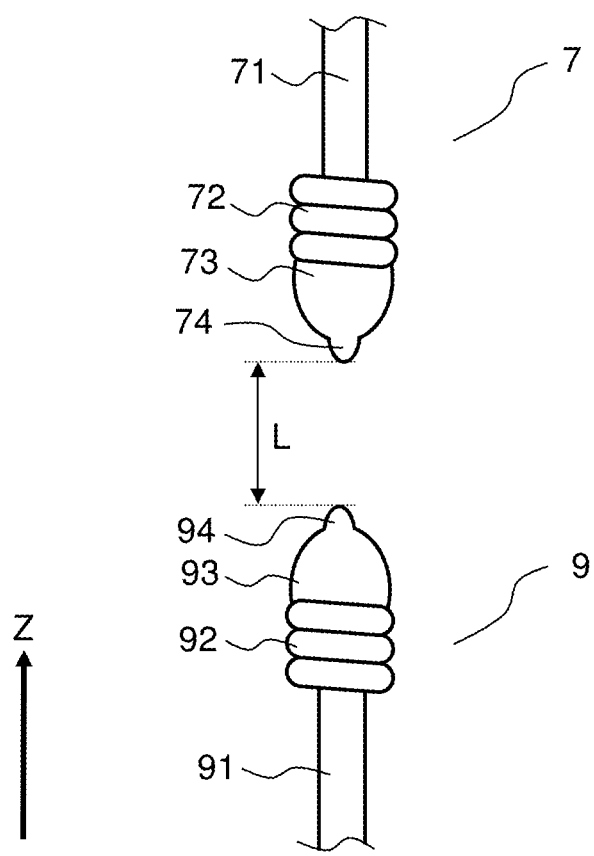
FIG. 9 is an enlarged view illustrating a portion of electrodes.
Figure 10:
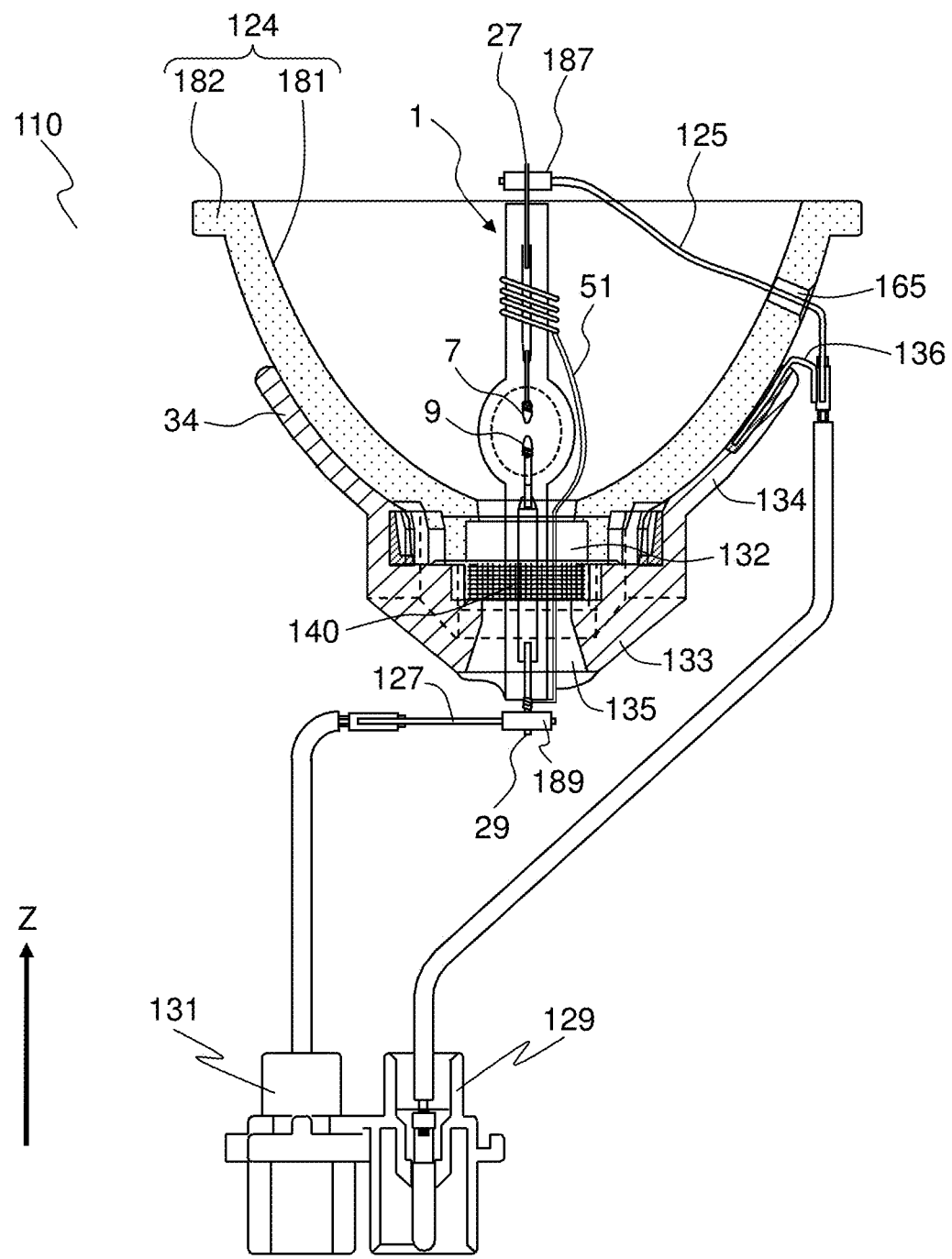
FIG. 10 is a sectional view illustrating a configuration of a light source unit according to the exemplary embodiment of the present disclosure.

Projector device 201 according to an exemplary embodiment of the present disclosure will be described with reference to the drawings. FIG. 5 is a perspective view illustrating a portion of an internal structure of projector device 201. FIG. 6 is a sectional view schematically illustrating an example of an internal structure of optical unit 209 in projector device 201. FIG. 7 is a perspective view schematically illustrating the example of the internal structure of optical unit 209 in projector device 201. FIG. 8 is a side view illustrating a configuration of high pressure discharge lamp 1. FIG. 9 is an enlarged view illustrating a portion of electrodes 7, 9. FIG. 10 is a sectional view illustrating a configuration of light source unit 110.

<Projector Device>

Projector device 201 includes luminous tube 3 made of quartz glass, concave reflecting mirror 124 in which the luminous tube is disposed inside, and optical unit 209 for projecting an image by utilizing light emitted from concave reflecting mirror 124 (see FIG. 10). Luminous tube 3 has luminous part 6, in which at least mercury is enclosed and a pair of electrodes 7, 9 is disposed so as to face each other, and a pair of sealing parts 11, 13 extending from luminous part 6 in opposite directions to each other (see FIG. 8). Luminous tube 3 is disposed so as to direct the pair of electrodes 7, 9 in a vertical direction (α<45°). Luminous tube 3 is typically in vertical lighting disposition (α≤30°). A region of the image projected from optical unit 209 (image display region 300) is a horizontally long rectangle (see FIG. 7).

The perspective view, in FIG. 5, illustrating the portion of the internal structure of projector device 201 is a view of projector device 201 obliquely seen from a bottom surface side. A Z-axis which is the same as the Z-axis in FIG. 2B is illustrated in FIG. 5. As mentioned above, a horizontal surface is parallel to an X-Y surface, and the Z-axis is parallel to the vertical direction. A light beam from projector device 201 is emitted in a direction vertical to the Z-axis (referred to as an X-axis direction).

Projector device 201 is a front projection type liquid crystal projector device. As illustrated in FIGS. 5 and 6, projector device 201 includes components, such as light source unit 110, power supply unit 207, control unit 215, and optical unit 209, inside case 213. Light source unit 110 includes a high pressure discharge lamp subjected to the vertical lighting disposition, and power supply unit 207 includes a drive circuit for lighting the high pressure discharge lamp. Optical unit 209 incorporates projection lens 219, a condensing lens (not illustrated), transmission type liquid crystal panels 67, 68, 69, and a drive motor (not illustrated). Projection lens 219 is disposed so as to protrude to an outside of case 213.

Power supply unit 207 converts an AC voltage (e.g., an AC voltage for home use ranging from 100 V to 120 V inclusive) into a predetermined DC voltage and supplies the voltage to the drive circuit and control unit 215. Control unit 215 has a substrate disposed in a vicinity of optical unit 209 and a plurality of electronic and electrical components mounted on this substrate.

Based on an image signal input from the outside, control unit 215 drives liquid crystal panels 67, 68, 69 to display a color image. Further, control unit 215 controls the drive motor disposed inside optical unit 209 to perform a focusing operation and a zoom operation.

Light emitted from light source unit 110 is focused by the condensing lens disposed inside optical unit 209 and passes through liquid crystal panels 67, 68, 69 disposed in the middle of an optical path. The image formed on liquid crystal panels 67, 68, 69 is projected onto a screen (not illustrated) via an optical system, such as projection lens 219. Optical unit 209 modulates the light emitted from light source unit 110 and forms an image for display.

In the present exemplary embodiment, optical unit 209 has liquid crystal panels 67, 68, 69 on the optical path. However, a configuration of optical unit 209 is not limited to such an example. The image to be displayed may be formed, for example, by a processor equipped with a digital mirror device.

As illustrated in FIG. 6, the light emitted from light source unit 110 upward in the vertical direction (the Z-axis) is collimated by the condensing lens disposed inside optical unit 209 and is branched by mirrors 60, 61, 62, 64, 65, disposed on the way of the optical path, for every color. For simplicity, optical elements, such as the condensing lens and various filters, are not illustrated in FIG. 6.

Mirrors 60 and 62 are dichroic mirrors configured so as to selectively reflect red (R) light and green (G) light, respectively. In a case of this example, the red light selectively reflected by mirror 60 is reflected by other mirror 61 and goes to dichroic prism 63. Before entering dichroic prism 63, the red light passes through first transmission type liquid crystal panel 67 and forms an intensity distribution of a red image. The light passed through mirror 60 includes green and blue components. Of this light, the green light selectively reflected by mirror 62 passes through second transmission type liquid crystal panel 68 and forms an intensity distribution of a green image. The blue light passed through mirror 60 is reflected by mirror 64. Then, the blue light is further reflected by other mirror 65 and goes to dichroic prism 63. Before entering dichroic prism 63, the blue light passes through third transmission type liquid crystal panel 69 and forms an intensity distribution of a blue image. First liquid crystal panel 67, second liquid crystal panel 68, and third liquid crystal panel 69 are spatial light modulation elements, respectively.

The images which are formed by the three spatial light modulation elements and are different for every color are synthesized to obtain a color image in dichroic prism 63. Light beams configuring the color image are emitted through projection lens 219 to display a horizontally long rectangular image onto an object, such as the screen. It is preferable that a long side direction of the image coincide with the horizontal direction.

A typical example of the spatial light modulation element includes a transmission type liquid crystal panel, a reflection type liquid crystal panel, or a digital mirror device. The spatial light modulation element is not limited to these examples. A number of spatial light modulation elements to be used is not limited to one. It is possible that the light emitted from the high pressure discharge lamp is divided into every color and a spatial light modulation element for forming an image which is different for every color is disposed on a divided optical path. The image which is different for every color and has been formed in this way can be synthesized to form a color image and projected onto the screen or the other object.

FIG. 7 is a perspective view schematically illustrating a disposition of the optical path and mirrors 60, 61, 62, 64, 65 disposed on the optical path and dichroic prism 63, which are illustrated in FIG. 6. Image display region 300 of a horizontally long rectangle formed by the light beam emitted from projector device 201 is illustrated in FIG. 7. Although it is not clearly illustrated in FIG. 7, image display region 300 is projected onto the screen (not illustrated) or the other object. Image display region 300 is enlarged at a desired magnification by projection lens 219. Image display region 300 has a lateral size (a width W) in a lateral direction (a Y-axis direction) and a longitudinal size (a height H) in a vertical direction (a Z-axis direction). A ratio of the lateral size to the longitudinal size (=W:H) can be designed, for example, in a ratio (an aspect ratio) of 4:3 or 16:9. In projector device 201 in the exemplary embodiment of the present enclosure, directions of the respective optical components in optical unit 209 are designed so that a horizontally long rectangular image in which the lateral size (the width W) is larger than the longitudinal size (the height H) can be obtained.

As mentioned above, the internal configuration of optical unit 209 is not limited to this example. The image to be displayed may be formed by the processor equipped with the digital mirror device. Further, the color image may be formed by disposing a rotary color filter disk of three colors on the optical path and by projecting images of different colors in a field sequential manner. In the luminous tube, the pair of electrodes is disposed so as to be directed in the vertical direction. Optical unit 209 is configured so as to project the horizontally long rectangular image by utilizing the light emitted from the luminous tube. In other words, it is preferable that the long side direction of the image region (image display region 300) projected on the object, such as the screen, intersect a plane parallel to both the optical axis of projection lens 219 and the center axis in the longitudinal direction of the pair of electrodes 7, 9. (It is more preferable that the long side direction be orthogonal to the plane.)

Here, for comparison, a case where the luminous tube in the horizontal lighting disposition is temporarily changed to the luminous tube in the vertical lighting disposition by rotating the conventional projector device at 90° around the optical axis of the projection lens is taken into consideration. In this case, the image region projected becomes a so-called vertically long rectangle. Therefore, a plane including both the optical axis of the projection lens and the center axis in the longitudinal direction of the pair of electrodes in the luminous tube does not intersect with a long side direction of the image region projected, and the plane is in parallel relation to the long side direction.

In the example illustrated in FIGS. 5, 6, and 7, light source unit 110 is disposed so that the light advances upward in the vertical direction (the Z-axis). However, the direction of light source unit 110 is not limited to this example. As long as the pair of electrodes is disposed in the vertical direction, the light source unit 110 may be disposed so as to emit the light downward in the vertical direction (the Z-axis).

According to the exemplary embodiment of the present disclosure, since the light emitted from the luminous tube advances in the vertical direction (the Z-axis), a size in the vertical direction of projector device 201 is relatively enlarged. However, an external shape of projector device 201 is not limited to a form described with reference to FIGS. 5 to 7, i.e., a form having an external shape in which a size in the vertical direction is larger than a size in another direction (the vertical placement type). The external shape may be a form in which the size in the vertical direction is smaller than the size in the other direction, a so-called horizontal placement type. Further, the horizontal placement type can be realized by disposing a mirror for reflecting the light emitted from the luminous tube in a direction parallel to the X-Y surface, i.e., by disposing the mirror so that an angle formed by the center axis in the longitudinal direction of the electrodes and a normal direction of a reflection surface of the mirror is about 45°. In any case, the external shape of projector device 201 is not limited to a specific shape, such as the vertical placement type or the horizontal placement type.

<High Pressure Discharge Lamp>

The high pressure discharge lamp is also referred to as an HID (High Intensity Discharge Lamp). The high pressure discharge lamp includes a lamp operated at high pressure, such as a metal halide lamp and an extra-high pressure mercury lamp. The pressure within the luminous tube of the high pressure discharge lamp can exhibit from several atmospheric pressures to a high value exceeding 100 atmospheric pressures during the operation depending on a kind of the lamp. High pressure discharge lamp 1 in the present exemplary embodiment is an extra-high pressure mercury lamp. However, the present disclosure is not limited to this, and high pressure discharge lamp 1 may be another kind of high pressure discharge lamp. Rated power consumption of high pressure discharge lamp 1 can range, for example, from 100 W to 1 KW. In the present exemplary embodiment, the rated power consumption is 310 W.

As illustrated in FIG. 8, high pressure discharge lamp 1 includes luminous tube 3, the pair of electrodes 7, 9, a pair of metallic foils 23, 25, a pair of external lead wires 27, 29, and trigger wire 51. Electrodes 7, 9, metallic foils 23, 25, and external lead wires 27, 29 configure a pair of electrode structures.

<Luminous Tube>

Luminous tube 3 is formed of a translucent material, such as quartz glass. Luminous tube 3 includes luminous part 6, in which discharge space 5 is formed, and sealing parts 11, 13 extending from both sides in the longitudinal direction of luminous part 6 in directions separating from each other. An external shape of luminous part 6 is, for example, a substantially spheroidal shape. External shapes of sealing parts 11, 13 are cylindrical shapes. The substantially spheroidal shape of luminous part 6 and the cylindrical shapes of sealing parts 11, 13 have a common center axis J1.

An inside of discharge space 5 is enclosed with mercury serving as a luminescent material, rare gas functioning as a start aiding material and formed of argon, krypton, xenon, or the like, and halogen gas formed of iodine or bromine necessary for realizing a halogen cycle inside discharge space 5. An enclosed capacity of the mercury can range, for example, from 150 mg/cm$^3$ to 650 mg/cm$^3$ inclusive. An enclosed capacity of the argon can range, for example, from 0.01 Mpa to 1 Mpa inclusive in an environment of 25° C. An enclosed capacity of the bromine can range, for example, from $1\times10^{-10}$ mol/cm$^3$ to $1\times10^{-3}$ mol/cm$^3$ inclusive. It is preferable that the enclosed capacity of the bromine can range from $1\times10^{-9}$ mol/cm$^3$ to $1\times10^{-5}$ mol/cm$^3$ inclusive.

A diameter of sealing parts 11, 13 of luminous tube 3 can range, for example, from 4.0 mm to 10 mm inclusive. A length of luminous tube 3 in an axis J1 direction can range, for example, from 40 mm to 150 mm inclusive. Luminous part 6 can have the substantially spheroidal shape in which, for example, an outer diameter ranges from 8.0 mm to 40 mm inclusive and a maximum inner diameter ranges from 4.0 mm to 20 mm inclusive. In the present exemplary embodiment, the diameter of sealing parts 11, 13 of luminous tube 3 is 6.0 mm, the length of luminous tube 3 in axis J1 direction is 60 mm, the outer diameter of the sphere of luminous part 6 is 11.6 mm, and the maximum inner diameter of luminous part 6 is 5.4 mm.

<Electrodes>

Electrodes 7, 9 have a bar-shaped structure. Respective one ends of electrodes 7, 9 are located within discharge space 5 inside luminous part 6. Electrodes 7, 9 are disposed within discharge space 5 by facing each other in a state of being separated by a predetermined distance (hereinafter referred to as an interelectrode distance) L. From a viewpoint of improving light extraction efficiency of high pressure discharge lamp 1, this interelectrode distance L can be set ranging, for example, from 0.5 mm to 2.5 mm. Electrodes 7, 9 can be formed of, for example, tungsten.

As illustrated in FIG. 9, electrodes 7, 9 have elongated small diameter parts 71, 91, large diameter parts 72, 92, and tips 73, 93, respectively. Large diameter parts 72, 92 are located between small diameter parts 71, 91 and tips 73, 93, respectively. Electrodes 7, 9 are formed by melting tips of bar-shaped members and portions of coils in a state in which the coils are wound around the tips of the bar-shaped members. Small diameter parts 71, 91 are parts of the above-described bar-shaped members around which the coils are not wound. Large diameter parts 72, 92 are configured by parts of the coils which are not melted and portions of the bar-shaped members located at centers of the coils. Tips 73, 93 are parts respectively coupled to large diameter parts 72, 92 and formed by melting into substantially hemispherical shapes. Protrusions 74, 94 are respectively formed at tips 73, 93 due to the halogen cycle during lighting of lamp 1. During lighting of high pressure discharge lamp 1, the tungsten configuring electrodes 7, 9 evaporates from portions of electrodes 7, 9 and becomes a halogen compound. When the halogen compound returns to vicinities of tops of tips 73, 93 in electrodes 7, 9, the halogen compound is deposited as tungsten. As a result, protrusions 74, 94 are formed. These protrusions 74, 94 are formed in an aging process which is a portion of a manufacturing process of high pressure discharge lamp 1. The interelectrode distance L is defined by a distance between protrusions 74, 94.

Tips 73, 93 of electrodes 7, 9 are substantially hemispherical. However, the present disclosure is not limited to this shape. For example, tips 73, 93 may have substantially spherical or conical shapes. A method for forming tips 73, 93 is not limited to the method formed by melting the tip of the bar-shaped member and the portion of the coil. For example, use an object cut into a substantially hemispherical shape, a substantially spherical shape, or a substantially conical shape may be used as tips 73, 93.

When high pressure discharge lamp 1 subjected to the vertical lighting disposition is lit, a temperature of electrode 7 located upward tends to be higher than a temperature of electrode 9 located downward. When the temperatures are different in this way, states of wear of the respective electrodes become different. Accordingly, the difference also affects the life of the lamp. Therefore, when the high pressure discharge lamp is driven by an AC pulse waveform, the temperatures of respective electrodes 7, 9 can be adjusted to an extent which does not affect the life of the lamp by appropriately making the driving waveform asymmetric.

<Metallic Foils>

As illustrated in FIG. 8, metallic foils 23, 25 are respectively sealed by sealing parts 11, 13. Metallic foils 23, 25 are respectively connected to electrodes 7, 9. Metallic foils 23, 25 can be formed of, for example, a metal, such as molybdenum. The connections between metallic foils 23, 25 and electrodes 7, 9 can be performed by, for example, welding. Respective lengths of metallic foils 23, 25 in the direction of the axis J1 can range, for example, from 10 mm to 50 mm. In the present exemplary embodiment, this length is 18 mm.

<External Lead Wires>

One ends of external lead wires 27, 29 are respectively connected to metallic foils 23, 25. External lead wires 27, 29 can be formed of, for example, a metal such as molybdenum. The connections between the one ends of external lead wires 27, 29 and metallic foils 23, 25 can be performed by, for example, welding. Other ends of external lead wires 27, 29 are respectively led out to the outside of sealing parts 11, 13 and are electrically connected to the drive circuit within power supply unit 207 illustrated in FIG. 5 via connectors.

<Trigger Wire>

Trigger wire 51 is used to reduce a voltage necessary to start high pressure discharge lamp 1 (referred to as a "starting voltage" in the present specification). Trigger wire 51 can be formed of, for example, a linear member with an outer diameter ranging from 0.1 mm to 2.0 mm inclusive. A material of trigger wire 51 can be, for example, a metal having conductivity and heat resistance, such as an alloy of iron and chrome or molybdenum. In the present exemplary embodiment, a sectional shape of trigger wire 51 is a circular shape. The sectional shape may be the other shape, such as a polygon. It is not necessary that trigger wire 51 is entirely formed of a metal wire. The shape of a portion of trigger wire 51 may be, for example, a band plate shape. In the present disclosure, a wire having a portion with such a band plate-shaped part is also referred to as the trigger wire.

<Light Source Unit>

As illustrated in FIG. 10, light source unit 110 includes high pressure discharge lamp 1 and concave reflecting mirror 124 for reflecting the light emitted from high pressure discharge lamp 1.

Concave reflecting mirror 124 is disposed so that an optical axis matches the center axis in the longitudinal direction of the pair of electrodes 7, 9. In other words, an angle between the center axis in the longitudinal direction of the pair of electrodes 7, 9 and the vertical direction is 20° or less. When this angle is larger than 20°, a region in which devitrification part 100 is formed is shifted to a region blocking the light beam. It is not necessary that a relationship between the optical axis and the center axis in the longitudinal direction of the pair of electrodes 7, 9 is parallel in a strict sense. In the present specification, matching of one axis to another axis is defined as an angle formed by the two axes is 30° or less.

Light source unit 110 is connected to a power supply via a pair of feeders 125, 127 and connectors 129, 131. The pair of feeders 125, 127 is respectively connected to external lead wires 27, 29 provided at the ends of high pressure discharge lamp 1, and connectors 129, 131 are respectively connected to other ends of feeders 125, 127. Feeders 125, 127 have parts in which core materials having conductivity are coated with insulating coating materials (parts on connectors 129, 131 side) and parts formed of conductive wires, such as nickel wires, connected to external lead wires 27, 29. Feeders 125, 127 are connected to external lead wires 27, 29 via connecting sleeves 187, 189, respectively. Concave reflecting mirror 124 has substrate 182 having a concave shape and a reflection surface 181 formed on substrate 182 on a front side of concave reflecting mirror 124. Concave reflecting mirror 124 also has opening 132 for receiving the one end of high pressure discharge lamp 1 at a center and through-hole 165 for passing feeder 125 at a portion of a side surface.

Light source unit 110 further includes base 133 for holding the one end of high pressure discharge lamp 1, reinforcing member 134 for covering a portion of a rear surface of concave reflecting mirror 124, and a regulating member 136 held between the rear surface of concave reflecting mirror 124 and reinforcing member 134. In order that feeder 125 can be connected to external lead wire 27, base 133 has a tubular structure with opening 135 for passing the one end of lamp 1 and ventilation hole 140. Ventilation hole 140 is provided to allow passage of air sent from a cooling fan device. The cooling fan device cools high pressure discharge lamp 1 and an inner space of concave reflecting mirror 124, which become hot during the operation. To suppress entering of dust or the like from the outside to the inside, ventilation hole 140 may be covered with a member having many holes capable of circulating air (e.g., a metal mesh).

Base 133 can be formed of, for example, an inorganic material having an electrical insulation property, such as steatite ($MgO \cdot SiO_2$). Base 133 can be formed of any ceramic material selected from a group consisting of alumina ($Al_2O_3$), zircon cordierite ($MgO \cdot ZrSiO_4$), silicon carbide (SiC), and silicon nitride ($Si_3N_4$).

Concave reflecting mirror 124 has substrate 182 made of glass and reflection surface 181 formed on a surface of substrate 182 by coating. Substrate 182 has an outer periphery having a concave shape and a cylindrical inner periphery having opening 132 for holding lamp 1. When viewed from a rear surface side, substrate 182 of concave reflecting mirror 124 has a shape similar to a square. A length of one side of concave reflecting mirror 124, when viewed from the rear surface side, can range approximately, for example, from 3 cm to 10 cm. By adopting such a shape, a light source having a large light flux can be efficiently contained in a limited space.

As a shape of reflection surface 181, a short focus type oval shape or parabola shape can be selected for a section including a center axis of concave reflecting mirror 124. When a concave lens is used together in light source unit 110, a long focus type oval shape can be selected. Reflection surface 181 may be formed of a reflecting layer of a dielectric multilayer film. In that case, reflection surface 181 can be configured so as to selectively reflect visible light and transmit ultraviolet rays and infrared rays. The dielectric multilayer film of reflection surface 181 can be appropriately designed according to a wavelength of radiation (an electromagnetic wave) to be utilized.

Concave reflecting mirror 124 can be formed of, for example, crystallized glass, aluminosilicate glass, or borosilicate glass. Reflection efficiency of concave reflecting mirror 124 increases as a position of through-hole 165 in concave reflecting mirror 124 is closer to a front end of reflection surface 181. Therefore, through-hole 165 in the present exemplary embodiment is provided relatively close to the front end of reflection surface 181.

The configuration of light source unit 110 is not limited to the above-described configuration and can employ various configurations. As long as the light source unit has a high pressure discharge lamp in which a pair of electrodes is disposed so as to be directed in a vertical direction, the light source unit of the present disclosure is not limited to a specific configuration.

<Drive Circuit>

Figure 11:
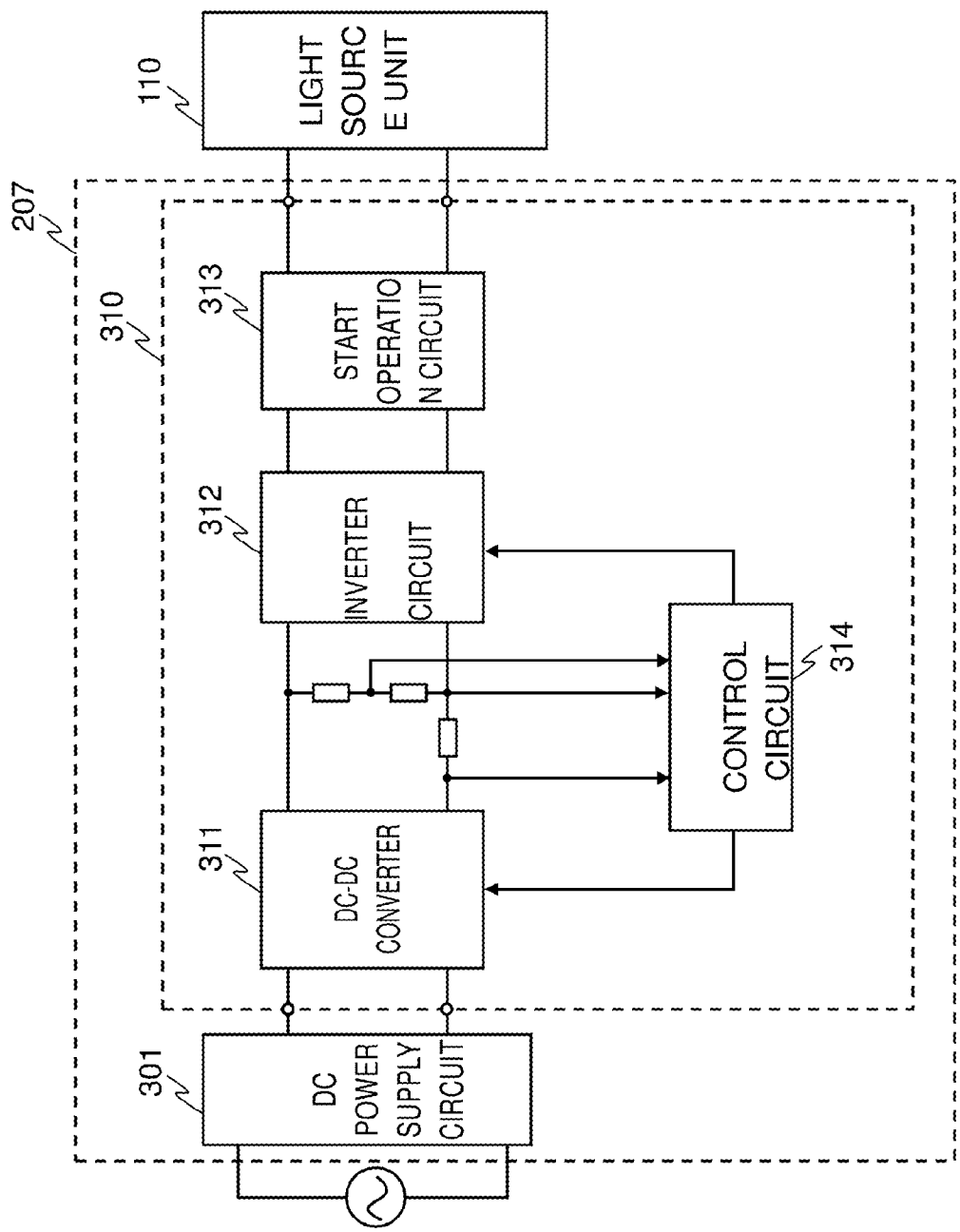
FIG. 11 is a block diagram illustrating a configuration example of a power supply unit.
Figure 12:
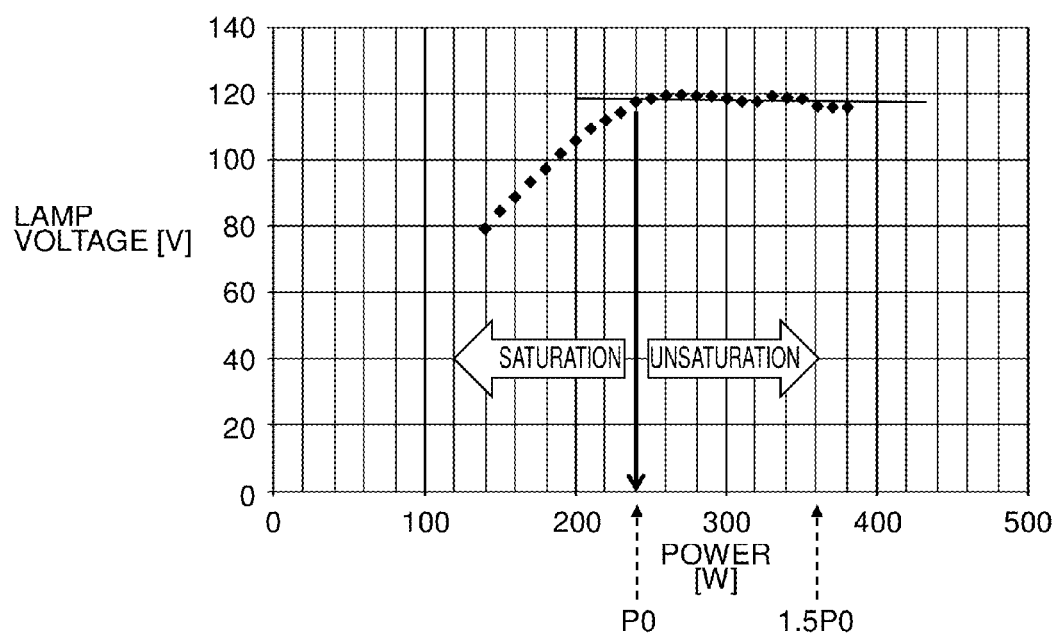
FIG. 12 is a graph illustrating an example of a relationship between power and voltage of the high pressure discharge lamp.
Figure 13A:
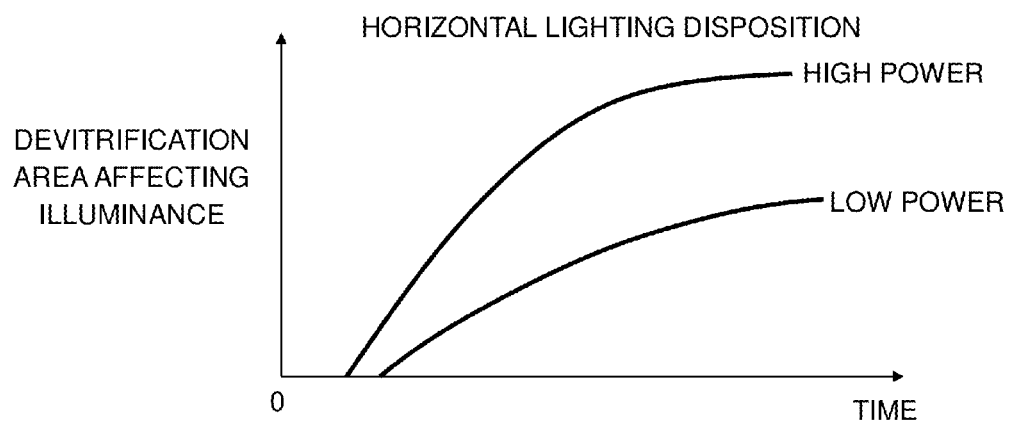
FIG. 13A is a graph for explaining time changes in a devitrification area affecting illuminance in the horizontal lighting disposition.
Figure 13B:
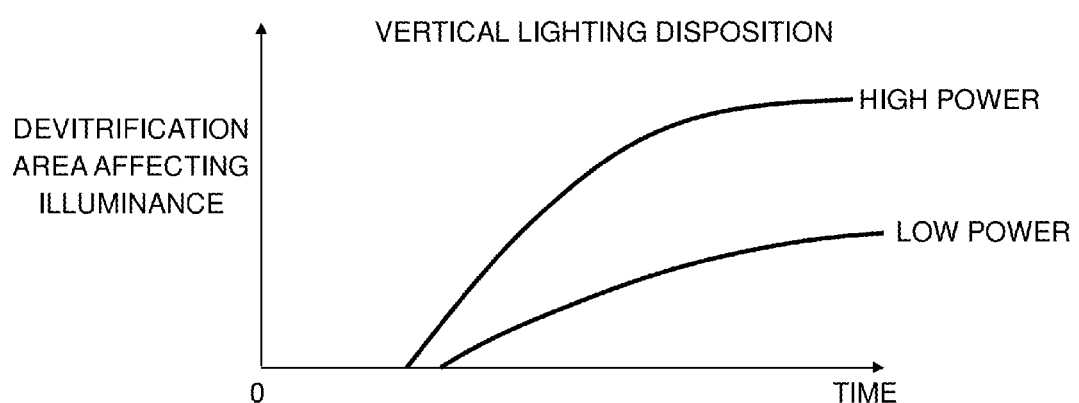
FIG. 13B is a graph for explaining time changes in the devitrification area affecting illuminance in the vertical lighting disposition.
Figure 14:
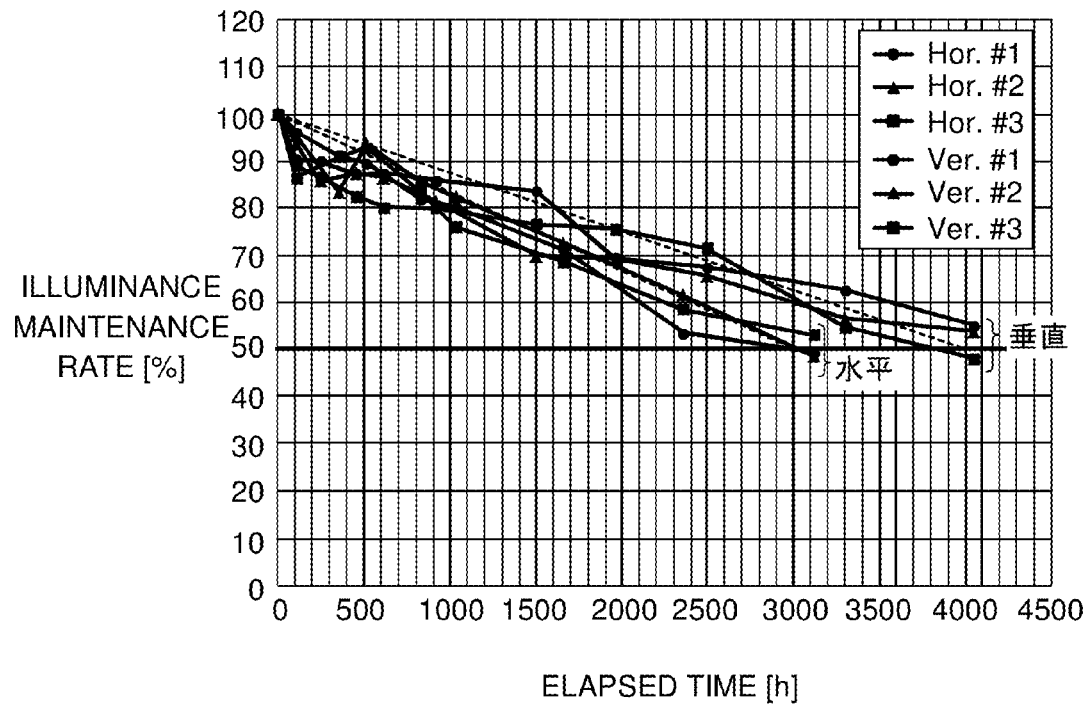
FIG. 14 is a graph illustrating a measurement result of time changes in illuminance maintenance rates of three samples in each of the vertical lighting disposition and the horizontal lighting disposition.

Next, a configuration of a drive circuit and a preferable range of lamp power in the present exemplary embodiment will be described with reference to the drawings. Here, the lamp power means a time average of a product of voltage applied to the pair of electrodes of the high pressure discharge lamp and current flowing in the electrodes. FIG. 11 is a block diagram illustrating a configuration example of power supply unit 207. FIG. 12 is a graph illustrating an example of a relationship between power and voltage of the high pressure discharge lamp. FIG. 13A is a graph for explaining time changes in a devitrification area affecting illuminance in the horizontal lighting disposition. FIG. 13B is a graph for explaining time changes in a devitrification area affecting illuminance in the vertical lighting disposition. FIG. 14 is a graph illustrating a measurement result of time changes in illuminance maintenance rates in each of the vertical lighting disposition and the horizontal lighting disposition.

The drive circuit in the present exemplary embodiment is provided in power supply unit 207 illustrated in FIG. 5. As illustrated in FIG. 11, power supply unit 207 includes DC power supply circuit 301 for converting commercial AC voltage into a predetermined DC voltage to output the DC voltage and a drive circuit 310 for converting the DC voltage output from DC power supply circuit 301 into an AC voltage of a predetermined frequency and supplying the AC voltage to light source unit 110. Drive circuit 310 includes DC-DC converter 311, inverter circuit 312, start operation circuit 313, and control circuit 314.

DC-DC converter 311 includes, for example, a step-down chopper circuit. The DC voltage output from DC power supply circuit 301 is stepped down to a predetermined DC voltage by switching operation within the step-down chopper circuit. This switching operation is controlled by control circuit 314. Control circuit 314 can be realized by, for example, a microcomputer.

Inverter circuit 312 is a full bridge circuit having, for example, four switching elements. Inverter circuit 312 converts the DC voltage output from DC-DC converter 311 into the AC voltage of the predetermined frequency (a rectangular wave). This conversion is realized when control circuit 314 switches an on/off state of each switching element.

Start operation circuit 313 is a resonance circuit having an inductor and a capacitor. Start operation circuit 313 is connected to two output terminals in inverter circuit 312 and two connectors 129, 131 in light source unit 110. At the time of starting, start operation circuit 313 amplifies the AC voltage output from inverter circuit 312 and supplies the voltage to the high voltage discharge lamp. With this configuration, dielectric breakdown between the electrodes of the high pressure discharge lamp is promoted.

Drive circuit 310 in the present exemplary embodiment drives the high pressure discharge lamp so that the lamp power is within a range of 1.5P0 or less. In this case, a lamp power when a state of mercury vapor inside the luminous tube changes from a saturated state to an unsaturated state is P0. With this configuration, since wear of the electrodes caused by heat during lighting can be suppressed, a life of the lamp can be improved.

Drive circuit 310 drives the high pressure discharge lamp so that, for example, the lamp power ranges from P0 to 1.5P0 inclusive.

In the relationship between the power and the voltage of the high pressure discharge lamp illustrated in FIG. 12, when the lamp power falls below threshold value P0 (in this example, about 240 W), the lamp voltage turns to decrease. When the lamp power falls below threshold value P0, vapor pressure of mercury is saturated and the mercury starts to coagulate. In other words, when the lamp power is threshold value P0 or more, the mercury is in the unsaturated state, and when the lamp power is less than P0, the mercury is in the saturated state.

An effect of improving the lamp life by directing the pair of electrodes in the vertical direction is particularly high in the above-described range in which the lamp power ranges from P0 to 1.5P0 inclusive. Regarding the high pressure discharge lamp designed to be used in the vertical lighting disposition, when the lamp power is set to 1.6P0 (about 380 W) and the lamp is continuously lit, the lamp life ranges from 1 to 1.5 times of the life of the lamp in the horizontal lighting disposition in the same conditions. On the other hand, when the lamp power is set to 1.5P0 (about 360 W) and the lamp is continuously lit, the lamp life is improved from 1.5 to 2 times of the life of the lamp in the horizontal lighting disposition in the same conditions. Further, when the lamp power is set to 1.25P0 (about 300 W) and the lamp is continuously lit, the lamp life is improved 2 times or more of the life of the lamp in the horizontal lighting disposition in the same conditions. When the lamp power is set to other values within the range from P0 to 1.5P0 inclusive, the effect of improving the life can be similarly confirmed.

In this way, an effect of adopting the vertical lighting disposition is further improved by suppressing the lamp power relatively low. This is caused by a fact that in the vertical lighting disposition, the lower the lamp power is, the longer a time until devitrification expands to the effective range from which the light is extracted is. In the horizontal lighting disposition (FIG. 13A) and the vertical lighting disposition (FIG. 13B), time changes in a devitrification area affecting illuminance will be described with reference to FIGS. 13A and 13B. These drawings illustrate respective time changes of a case where the lamp power is relatively high and a case where the lamp power is relatively low. The devitrification area affecting illuminance in a vertical axis means an area of a part of the formed devitrification part that reaches the effective range from which the light is extracted. Since the devitrification appears mainly at the center in the horizontal lighting disposition, the devitrification affects the illuminance from an initial stage and the devitrification area is expanded as illustrated in FIG. 13A. On the other hand, in the vertical lighting disposition where the devitrification part mainly appears at the end, it takes time for the devitrification to affect the illuminance even if the devitrification appears, and expansion of the devitrification area is also relatively gradual as illustrated in FIG. 13B. However, when the power is relatively high, the devitrification part affecting illuminance appears relatively early and an increasing speed of the devitrification part is also high. Accordingly, the case where the lamp power is low is more effective for improving the life.

The lamp power ranges, for example, from 1.1P0 to 1.4P0 inclusive. In another example, the lamp power can range from 1.2P0 to 1.3P0 inclusive. In this way, further improvement of the life can be expected by restricting an upper limit and a lower limit of the lamp power.

In each of the vertical lighting disposition and the horizontal lighting disposition, a measurement result of time changes in illuminance maintenance rates of three samples (#1, #2, #3) will be described with reference to FIG. 14. All design conditions of the three samples are the same for each of the vertical lighting disposition and the horizontal lighting disposition. Lamp powers supplied to samples #1, #2, and #3 are P0 (about 240 W), 1.25P0 (about 300 W), and 1.6P0 (about 380 W), respectively. A size of concave reflecting mirror 124, when viewed in the optical axis direction, is 68 mm square. While the lamp is cooled by a DC fan, the life is measured in conditions in which the lamp power is 380 W and the lamp is repeatedly turned on for two hours and turned off for 15 minutes. Here, the life is defined by a time until a ratio of illuminance at a point in time relative to illuminance in an initial state (i.e., the illuminance maintenance rate) becomes 50%. In the example illustrated in FIG. 14, the life in a case of the vertical lighting disposition (about 4,000 hours) is improved about 1.3 times as compared with the life in a case of the horizontal lighting disposition (about 3,000 hours). In this way, the effect of improving the life by the vertical lighting disposition is large.

As mentioned above, according to projector device 201, the position of devitrification occurred in luminous tube 3 can be excluded from the region of luminous part 6 in which the light intensity is relatively high. Specifically, the devitrification occurs in vicinities of sealing parts 11, 13 of luminous part 6. The light emitted from the discharge space of luminous tube 3 is emitted from an opening of concave reflecting mirror 124 directly or after being reflected by an inner surface of concave reflecting mirror 124. At that time, the emitted light from the discharge space is emitted in all directions of 360° except rears of electrodes 7, 9 with the center of luminous part 6 being a pseudo luminous center. A reason why the rears of electrodes 7, 9 are excluded is that electrodes 7, 9 generate shadows and block the emitted light. Therefore, even if the devitrification occurs in the vicinities of sealing parts 11, 13 of luminous part 6, since the vicinities of sealing parts 11, 13 are located behind electrodes 7, 9, the devitrification does not affect the emitted light from concave reflecting mirror 124. Accordingly, reduction of the illuminance maintenance rate can be suppressed. According to the configuration of projector device 201, inclination of the center axis in the longitudinal direction of the pair of electrodes 7, 9 with respect to the vertical direction falls within 20°. Consequently, the range in which the devitrification occurs can be sufficiently suppressed to the vicinities of sealing parts 11, 13.

What is claimed is:

1. A projector device comprising:
   a luminous tube made of quartz glass including a luminous part and a pair of sealing parts, the luminous part having at least enclosed mercury therein and a pair of electrodes disposed to face each other, the pair of sealing parts extending from the luminous part in opposite directions to each other;
   a concave reflecting mirror in which the luminous tube is disposed inside; and
   an optical unit for projecting an image by utilizing light emitted from the concave reflecting mirror,
   wherein the luminous tube is disposed to direct a center axis in a longitudinal direction of the pair of electrodes in a vertical direction,
   wherein an angle between the center axis in the longitudinal direction of the pair of electrodes and the vertical direction is less than 45° and more than 0°, and
   wherein a region of the image projected from the optical unit is a horizontally long rectangle.

2. The projector device according to claim 1, wherein the concave reflecting mirror is disposed with its optical axis being matched to the center axis in the longitudinal direction of the pair of electrodes.

3. The projector device according to claim 1, wherein the optical unit has
   at least one spatial light modulation element for forming the image by utilizing the light emitted from the concave reflecting mirror, and
   a projection lens for projecting the image formed by the spatial light modulation element, and
   wherein a long side direction of the region of the image that is projected is orthogonal to a plane parallel to both an optical axis of the projection lens and the center axis in the longitudinal direction of the pair of electrodes.

4. The projector device according to claim 1, further comprising a case housing the luminous tube inside, wherein the luminous tube is disposed to direct the center axis in the longitudinal direction of the pair of electrodes in the vertical direction to a bottom surface of the case.

5. The projector device according to claim 4, wherein an angle between the center axis in the longitudinal direction of the pair of electrodes and the vertical direction is less than 45° and more than 0°.

6. A projector device comprising:
   a luminous tube made of quartz glass including a luminous part and a pair of sealing parts, the luminous part having at least enclosed mercury therein and a pair of electrodes disposed to face each other, the pair of sealing parts extending from the luminous part in opposite directions to each other;
   a concave reflecting mirror in which the luminous tube is disposed inside; and an optical unit for projecting an image by utilizing light emitted from the concave reflecting mirror,
   wherein the luminous tube is disposed to direct the pair of electrodes in a vertical direction,
   wherein a region of the image projected from the optical unit is a horizontally long rectangle, and
   wherein an angle between the center axis in the longitudinal direction of the pair of electrodes and the vertical direction is 20° or less and more than 0°.

7. A projector device comprising:
   a luminous tube made of quartz glass including a luminous part and a pair of sealing parts, the luminous part having at least enclosed mercury therein and a pair of electrodes disposed to face each other, the pair of sealing parts extending from the luminous part in opposite directions to each other;
   a concave reflecting mirror in which the luminous tube is disposed inside; and
   an optical unit for projecting an image by utilizing light emitted from the concave reflecting mirror,
   wherein the luminous tube is disposed to direct the pair of electrodes in a vertical direction, and
   wherein a region of the image projected from the optical unit is a horizontally long rectangle,
   the projector device further comprising:
   a high pressure discharge lamp having the luminous tube; and
   a drive circuit electrically connected to the pair of electrodes and configured to drive the high pressure discharge lamp,
   wherein, assuming that lamp power of the high pressure discharge lamp is P0 when a state of mercury vapor inside the luminous tube changes from a saturated state to an unsaturated state, the drive circuit drives the high pressure discharge lamp at 1.5P0 or less as a range of the lamp power.

8. The projector device according to claim 7, wherein the drive circuit drives the high pressure discharge lamp at from P0 to 1.5P0 inclusive as the range of the lamp power.

9. The projector device according to claim 7, wherein the drive circuit drives the high pressure discharge lamp at from 1.1P0 to 1.4P0 inclusive as the range of the lamp power.

10. The projector device according to claim 7, wherein the drive circuit drives the high pressure discharge lamp at from 1.2P0 to 1.3P0 inclusive as the range of the lamp power.

* * * * *